Nov. 28, 1933.  C. F. M. VAN BERKEL ET AL  1,936,890
SHARPENER FOR SLICING MACHINES
Filed Jan. 12, 1928
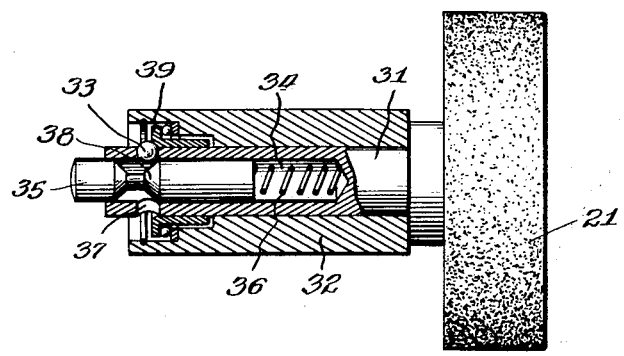
Inventors
CORNELIS F.M. VAN BERKEL
ADRIANUS VAN DUYN
By
Nissen & Clans
Attys.

Patented Nov. 28, 1933

1,936,890

UNITED STATES PATENT OFFICE 1,936,890

SHARPENER FOR SLICING MACHINES

Cornelis F. M. van Berkel and Adrianus van Duyn, Wassenaar, Netherlands, assignors to U. S. Slicing Machine Company, La Porte, Ind., a corporation of Indiana Application January 12, 1928, Serial No. 246,332, and in Germany January 15, 1927

5 Claims. (Cl. 51—248)

This invention relates to devices for sharpening the rotary circular knives of slicing machines and has for its object the provision of slicing machine knife sharpeners which shall be of improved construction and operation.

A further object is to provide sharpeners of the class named in which the grinding disc may be easily removed and replaced. Other objects and advantages will appear from the following description.

The invention is exemplified in the combination and arrangement of parts shown in the accompanying drawing and described in the following specification, and it is more particularly pointed out in the appended claims.

In the drawing:—

The figure in the drawing illustrates one embodiment of our invention.

In sharpeners for slicing machine knives, it is common practice to provide spindles having grinding discs mounted thereon for engaging the rotary circular slicing knives. Two discs are usually provided, one for grinding the beveled edge of the knife and the other for removing the burr at the side of the edge opposite the bevel after the grinding has been completed. In grinders, as previously constructed, it is difficult to remove or exchange the grinding discs for cleaning or other purposes. The present invention overcomes this difficulty by providing means for attaching the grinding disc in such way that by a simple manipulation, it may be quickly and easily released and removed.

In the form of the invention shown in the drawing, grinder 21 is shown fixed to a shaft 31 journaled in a bearing 32. The shaft is removably held in the bearing 32 by a ball 33. The shaft is provided with a longitudinal opening 34 at its rear end in which a pin 35 is slidably mounted and pressed outwardly by a spring 36. One or more balls 33 are disposed in cylindrical openings 37 extending through the wall of the opening 34. The pin 35 is provided with a reduced portion forming a conical surface 38 which engages the ball 33 and presses it outwardly into contact with a bearing sleeve 39. So long as the balls are pressed outwardly, they will retain the shaft 31 in place in its journal 32. By pressing inwardly on the pin 35, however, the balls 33 will be released so that they are free to move into the interior of the opening 34 so that the shaft 31 may be removed from its bearing.

It will be seen that a very efficient yet simple mechanism is provided for releasably securing the spindle rotatably within the journal so that the same can be easily removed when desired. No special tools are necessary and a simple pressure on the end of the pin 35 will release the balls and permit the grinder to be withdrawn. Also after the pin 35 has been moved inwardly sufficiently to release the ball 33, a continued pressure on the pin will move the grinder to the right relative to the journal 32. This pressure will move the spindle 31 sufficiently to the right to prevent the ball 33 from entering the opening 37, and the pin 35 can thereafter be released and the spindle and grinder bodily removed by manually grasping the grinder 21.

Many other embodiments of the invention will readily suggest themselves to those skilled in the art and we, therefore, do not wish to confine ourselves to the particular embodiments shown and described.

We claim:—

1. A sharpener for slicing machine knives comprising a shaft, a journal bearing for said shaft in which said shaft is rotatable, a grinding element mounted on said shaft, said shaft having a recess therein, a plunger mounted within said recess and having a beveled surface, a ball disposed in an opening in said shaft in position to engage said beveled surface and to project from said shaft in position to retain said shaft in its bearing, a spring for moving said plunger in a direction to cause said ball to project from said shaft said ball being movable into said shaft when said plunger is moved against the force of said spring, to free said shaft from its bearing.

2. A sharpener for slicing machine knives comprising a shaft, a journal bearing for said shaft, a grinding element mounted on said shaft, a thrust bearing sleeve between said bearing and said sleeve, a cylindrical recess at one end of said shaft, a plunger in said recess, a spring at the bottom of said recess in position to act against the bottom of said plunger, a beveled actuator on said plunger, and a retaining ball engaged by said actuator and moved thereby through an opening in said shaft against said sleeve.

3. A sharpener for slicing machine knives, comprising a grinder, a spindle on which said grinder is mounted, a journal bearing for said spindle, a clutch, a spiral spring for applying said clutch, and a manually operated device separate from said spindle for compressing said spring to release said clutch to permit removal of said grinder with its spindle from said journal bearing.

4. A sharpener for slicing machine knives, comprising a grinder, a spindle secured to said grinder to rotate therewith, a journal bearing for said spindle, a clutch, an enclosed spring for applying said clutch to hold said spindle against axial withdrawal from said journal bearing while permitting free rotation of said grinder and its spindle, and manual means separate from said spindle for releasing said clutch.

5. A sharpener for slicing machine knives, comprising a grinder, a spindle therefor, a journal bearing for said spindle, a clutch comprising a plunger in said spindle, a spring in said spindle for applying said clutch, and an extension from said plunger in position to receive manual pressure to release said clutch against the action of said spring.

CORNELIS F. M. van BERKEL.
ADRIANUS van DUYN.